United States Patent
Buhl

[19]

[11] Patent Number: 6,113,302
[45] Date of Patent: *Sep. 5, 2000

[54] BALL-AND-SOCKET JOINT FOR WHEEL SUSPENSIONS IN MOTOR VEHICLES

[75] Inventor: Reinhard Buhl, Bohmte, Germany

[73] Assignee: Lemförder Metallwaren AG, Lemförde, Germany

[ * ] Notice: Under 35 U.S.C. 154(b), the term of this patent shall be extended for 714 days.

[21] Appl. No.: 08/669,112

[22] Filed: Jun. 24, 1996

Related U.S. Application Data

[63] Continuation of application No. 08/348,491, Dec. 2, 1994.

[30]   Foreign Application Priority Data

Dec. 4, 1993 [DE] Germany .......................... 93 18 586 U

[51] Int. Cl.⁷ ...................................................... F16C 11/00
[52] U.S. Cl. ........................... 403/133; 403/135; 403/140
[58] Field of Search ..................................... 403/133, 135, 403/138, 140, 122, 134

[56]   References Cited

U.S. PATENT DOCUMENTS 4,720,205   1/1988   Ito .
5,318,373   6/1994   Buhl .

FOREIGN PATENT DOCUMENTS

4102863C1   6/1992   Germany .

*Primary Examiner*—Bruce A. Lev
*Attorney, Agent, or Firm*—McGlew and Tuttle, P.C.

[57]   ABSTRACT

The present innovation pertains to a ball-and-socket joint for wheel suspensions in motor vehicles including a joint ball provided at the end of a ball pin, bearing shell made of plastic for mounting the joint ball, housing which accommodates the bearing shell and which is closed by an inner cover on one side, and from which the ball pin exits on the side opposite the cover, an outer bushing for mounting the joint in a motor vehicle via an elastomeric layer arranged adhesively between the housing and the outer bushing and a movable flange which is rigidly arranged on the outside of the housing and is provided on its radial outer surface with elastomeric coating. The outer bushing of the ball joint is provided with a circular radial flange on a side of the outer cover. The circular radial flange is fixed together with the outer cover by deformation of the material of the edge of the mounting bushing of the motor vehicle part.

14 Claims, 1 Drawing Sheet

BALL-AND-SOCKET JOINT FOR WHEEL SUSPENSIONS IN MOTOR VEHICLES

CROSS REFERENCE TO RELATED APPLICATIONS

This is a continuation application of Ser. No. 08/348,491 filed Dec. 2, 1994.

FIELD OF THE INVENTION

The present innovation pertains to a ball-and-socket joint for wheel suspensions in motor vehicles including a joint ball provided at the end of a ball pin, a bearing shell made of plastic for mounting the joint ball, a housing which accommodates the bearing shell and which is closed by an inner cover on one side, and from which the ball pin exits on the side opposite the cover, an outer bushing for mounting the joint in a motor vehicle via an elastomeric layer arranged adhesively between the housing and the outer bushing and a movable flange which is rigidly arranged on the outside of the housing and is provided on its radial outer surface with elastomeric coating.

BACKGROUND OF THE INVENTION

Such a ball-and-socket joint has been known from DE 41,02,863 C1 (corresponding to U.S. Pat. No. 5,318,373). According to this patent, the joint ball of a ball pin is mounted in a bearing shell made of plastic. A housing, which accommodates this bearing shell and is closed by a cover on one side, and from which the ball pin exits on the side opposite the cover, is connected to an outer bushing via an elastomeric layer. The outer bushing is used to mount the ball-and-socket joint in the motor vehicle part. The elastomeric layer is adhesively connected to the housing and to the outer bushing. Furthermore, the joint has a movable flange, which is fixed together with the cover on the housing. This movable flange, which is provided with an elastomeric coating on its radial outer surfaces, limits the radial path of the bearing. According to this document, the ball-and-socket joint can be completely closed by an outer cover. This outer cover is fixed on a radially extending flange of the outer bushing by deformation of the material of the outer bushing.

Such a ball-and-socket joint, which has a dimension larger than specified, is pressed into a mounting bushing of the corresponding motor vehicle part, which bushing has a dimension smaller than specified, and is in contact with the radial flange of the outer bushing on the motor vehicle part. Such a joint is secured axially only via the snug fit in the motor vehicle part. Axial securing is not always guaranteed during continuous operation.

SUMMARY AND OBJECTS OF THE INVENTION

The basic object of the present innovation is to develop a ball-and-socket joint which is fixed in the part of the motor vehicle intended for mounting in an axially secured manner, and which can be mounted in the motor vehicle part intended for this purpose in a simple and compact manner.

A ball-and-socket joint according to the solution described consists of a ball pin, whose joint ball is movably mounted in a bearing shell made of plastic. The bearing shell is placed into a housing and is closed with an inner cover on one side. The housing is surrounded by an elastomeric sleeve. This may be provided with incisions to improve radial damping. The outer bushing is used to mount the ball-and-socket joint in the mounting bushing of the motor vehicle part, e.g., a suspension arm. This outer bushing is preferably cylindrical and completely surrounds the housing. The elastomeric sleeve, which is adhesively connected to the outer bushing and the housing, is connected between these two parts. The outer bushing passes over on the cover side into a radially extending flange, which lies on a complementary contour of the mounting bushing of the motor vehicle part. An outer cover is placed, in the manner of a cap-type gasket, over the entire joint on the side opposite the side on which the ball pin exits. As a result, the joint is closed with two covers. The inner cover closes the joint, and the outer cover is used for axial fixation in the mounting bushing and for protecting the elastomeric sleeve from contamination. With its radially circular shoulder, the outer cover lies on the radial flange of the outer bushing of the ball-and-socket joint and is fixed together with that in the mounting bushing of the motor vehicle part. This can be achieved in an advantageous manner by material deformation. By pressing the outer bushing together with the outer cover, it is possible to achieve permanently durable axial fixation of the ball-and-socket joint in a simple manner. The motor vehicle part may be dimensioned smaller than in prior-art designs.

The ball pin exits from the housing on the side opposite the cover. The ball pin is surrounded in the known manner by a sealing element, whose opposite end is also in sealing contact with the outer edge of the housing.

On the cover side, a movable flange is fixed, together with the inner cover, in the housing. This movable flange has an elastomeric coating on its outer circumference. This coating is used as a stop limitation against the outer cover in the radial and axial directions.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
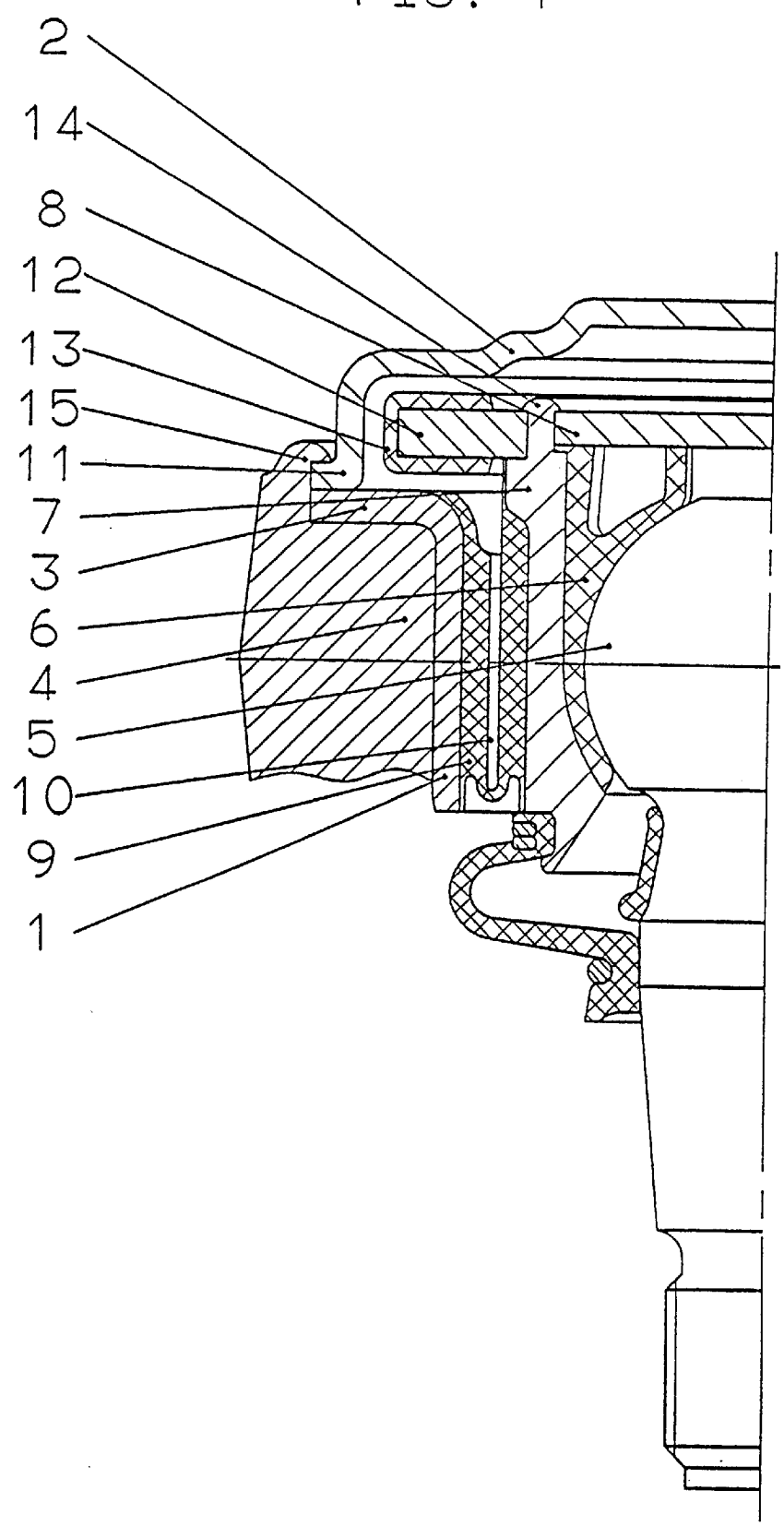
FIG. 1 is a detail of a ball-and-socket joint according to the present innovation.

FIG. 1 shows a ball-and-socket joint, which includes a ball pin, whose joint ball 5 is movably mounted in a bearing shell 6 made of plastic. The bearing shell 6 is placed into a housing 7 and is closed with an inner cover 8 on one side. The housing 7 is surrounded by an elastomeric sleeve 9. This sleeve may be provided with incisions 10 to improve the radial damping. An outer bushing 1 is used to mount the ball-and-socket joint in the mounting bushing of the motor vehicle part 4, e.g., a suspension arm. The outer bushing 1 is preferably cylindrical, and it completely surrounds the housing 7. An elastomeric sleeve 9, which is adhesively connected to the outer bushing 1 and the housing 7, is located between these two parts. On the cover side, the outer bushing 1 passes over into a radially extending flange 3, which is in contact with a complementary contour of the mounting bushing of the motor vehicle part 4. An outer cover 2 is placed over the entire joint, similarly to a cap-type gasket, on the side opposite the side on which the ball pin exits. With its radially circular shoulder 11, the outer cover 2 lies on the radial flange 3 of the outer bushing 1 of the ball-and-socket joint, and is fixed, together with the outer bushing 1, in the mounting bushing of the motor vehicle part 4 by deformation of the material. A circumferential bead of material 15 is formed as a result. Durable axial fixation of the ball-and-socket joint can be achieved in a simple manner due to the outer bushing 1 being pressed together with the outer cover 2. On the cover side, a movable flange 12 is fixed in the housing 7 together with the inner cover 8. This may also be made possible by material deformation, e.g., by rolling, so that a rolled edge 14 will lock the two parts. The movable flange 12 has an elastomeric coating 13 on its outer circumference. This coating 13 serves the purpose of a stop limitation in relation to the outer cover 2 in the radial and axial directions.

A sealing bellows is provided connected to the housing 7 and connected to the ball pin. This provides an enclosed space delimited by the sealing bellows, the ball pin, the housing 7, the bearing shell 6 and the joint ball 5. The cover 2 also delimits a closed space along with the inner cover 8 movable flange 12 with elastomeric coating 13, the elastomeric layer 9 and the circular radial flange 3. In this way, the outer cover helps define an enclosed unit with the housing 7 and the movable flange 12 with elastomeric coating 13 disposed within the enclosed unit.

While a specific embodiment of the invention has been shown and described in detail to illustrate the application of the principles of the invention, it will be understood that the invention may be embodied otherwise without departing from such principles.

APPENDIX

LIST OF REFERENCE NUMERALS

1 Outer bushing
2 Outer cover
3 Radial flange
4 Mounting bushing of the motor vehicle part
5 Joint ball of the ball pin
6 Bearing shell
7 Housing
8 Inner cover
9 Elastomeric sleeve
10 Incision
11 Shoulder
12 Movable flange
13 Elastomeric coating
14 Rolled edge
15 Material bead

What is claimed is:

1. A ball-and-socket joint for wheel suspensions in motor vehicles in combination with a motor vehicle part with a mounting bushing, the combination comprising:
    a ball pin;
    a joint ball provided at the end of said ball pin;
    a bearing shell formed of plastic for mounting said joint ball;
    a housing for accommodating said bearing shell, said housing being closed by an inner cover on one side, said ball pin exiting said housing on a side opposite said inner cover;
    an outer bushing for mounting said joint in the motor vehicle part via an elastomeric layer arranged adhesively between said housing and said outer bushing, said outer bushing being provided with a circular radial flange;
    a movable flange rigidly arranged on an outside of said housing, said movable flange being provided on a radial outer surface with an elastomeric coating; and
    an outer cover for closing the ball and socket joint, said outer cover overlapping both said inner cover and said movable flange, said circular radial flange being provided on a side of said outer cover, said circular radial flange being fixed together with said outer cover by deformation of material at an edge of said mounting bushing of the motor vehicle part to press said outer bushing together with said outer cover.

2. A combination in accordance with claim 1, wherein said ball and socket joint is held in said mounting bushing of said motor vehicle part in a positive-locking manner, secured against rotation.

3. A combination in accordance with claim 2, wherein said motor vehicle part for mounting the ball and socket joint, the outer bushing of the ball and socket joint and the outer cover are all formed of the same material.

4. A combination in accordance with claim 1, wherein said motor vehicle part for mounting the ball and socket joint, the outer bushing of the ball and socket joint and the outer cover are all formed of the same material.

5. A combination in accordance with claim 1, wherein said motor vehicle part for mounting the ball and socket joint, the outer bushing of the ball and socket joint and the outer cover are all formed of metal.

6. A ball-and-socket joint for wheel suspensions in combination with a motor vehicle mounting bushing part, the combination comprising:
    a ball pin;
    a joint ball provided at the end of said ball pin;
    a bearing shell formed of plastic for mounting said joint ball;
    a housing for accommodating said bearing shell;
    a housing cover, said housing being closed by said housing cover on one side, said ball pin exiting said housing on a side opposite said housing cover;
    an outer bushing;
    an elastomeric layer arranged adhesively between said housing and said outer bushing, said outer bushing for mounting said joint in the motor vehicle part via said elastomeric layer, said outer bushing being provided with a circular radial flange;
    a movable flange which is rigidly arranged on an outside of said housing, said movable flange being provided on a radial outer surface with an elastomeric coating;
    an outer cover covering both said inner cover and said movable flange, said circular radial flange being provided on a side of said outer cover, said circular radial flange being fixed together with said outer cover by deformation of material at an edge of the mounting bushing of the motor vehicle part to press with said outer bushing together with said outer cover and to define an enclosed space delimited by said outer cover, said inner cover, said moveable flange with elastomeric coating, said elastomeric layer and said circular radial flange, said mounting bushing of said motor vehicle part for mounting the ball and socket joint, said outer bushing of the ball and socket joint and said outer cover being all formed of the same material; and
    a sealing bellows connected to said hosing and connected to said ball pin to define an enclosed space delimited by said sealing bellows, said ball pin, said housing, said bearing shell and said joint ball.

7. A combination in accordance with claim 6, wherein said ball and socket joint is held in said mounting bushing of said motor vehicle part in a positive-locking manner, secured against rotation.

8. A combination in accordance with claim 7, wherein said motor vehicle part for mounting the ball and socket joint, the outer bushing of the ball and socket joint and the outer cover are all formed of the same material.

9. A combination in accordance with claim 6, wherein said motor vehicle part for mounting the ball and socket joint, the outer bushing of the ball and socket joint and the outer cover are all formed of metal.

10. A ball-and-socket joint motor in combination with a motor vehicle part with a mounting bushing, the combination comprising:

a ball pin;

a joint ball provided at the end of said ball pin;

a bearing shell formed of plastic for supporting said joint ball for pivotal movement;

a housing, said bearing shell being disposed in said housing;

an inner cover disposed on one side of said housing, said ball pin exiting said housing on a side opposite said cover said inner cover closing said housing for maintaining said bearing shell and said joint ball in said housing;

an outer bushing;

an elastomeric layer arranged adhesively between said housing and said outer bushing, said outer bushing being provided with a circular radial flange for mounting said joint in the motor vehicle part;

a movable flange which is rigidly arranged on an outside of said housing, said movable flange being provided on a radial outer surface with an elastomeric coating;

a sealing bellows connected to said hosing and said ball pin to define an enclosed space delimited by said sealing bellows, said ball pin, said housing, said bearing shell and said joint ball;

an outer cover, said circular radial flange being provided abutting a side of a portion of said outer cover, said circular radial flange being fixed together with said outer cover by deformation of material at an edge of the mounting bushing of the motor vehicle part to press said outer bushing together with said outer cover to define an enclosed unit with said housing and said moveable flange with elastomeric coating disposed within said enclosed unit, said mounting bushing, the outer bushing of the ball and socket joint and said outer cover being all formed of the same material.

11. A combination in accordance with claim 10, wherein said ball and socket joint is held in said mounting bushing of said motor vehicle part in a positive-locking manner, secured against rotation.

12. A combination in accordance with claim 11, wherein said motor vehicle part for mounting the ball and socket joint, the outer bushing of the ball and socket joint and the outer cover are all formed of metal.

13. A combination in accordance with claim 10, wherein said motor vehicle part for mounting the ball and socket joint, the outer bushing of the ball and socket joint and the outer cover are all formed of metal.

14. A combination in accordance with claim 10, wherein said outer cover and said circular radial flange of said outer bushing are clamped to the mounting bushing by said deformation of said material at said edge of the mounting bushing and between said deformation of said mounting bushing and another part of said mounting bushing.

* * * * *